United States Patent [19]

Takabayashi

[11] 4,038,726

[45] Aug. 2, 1977

[54] PLASTIC ADJUSTER FOR A BELT

[75] Inventor: Teruo Takabayashi, Kyoto, Japan

[73] Assignee: Kohshoh Limited, Kyoto, Japan

[21] Appl. No.: 663,804

[22] Filed: Mar. 4, 1976

[30] Foreign Application Priority Data

July 1, 1975 Japan ................... 50-92546

[51] Int. Cl.² ............... A44B 11/06; A44B 11/20
[52] U.S. Cl. ........................................ 24/198; 24/169;
24/186; 24/255 SL; 24/248 SL
[58] Field of Search ........... 24/198, 169, 170, 255 SL,
24/248 SL, 166, 249 SL, 265 BC, 30.5 P, 191;
132/48 A, 48 R

[56] References Cited

U.S. PATENT DOCUMENTS

| 569,638 | 10/1896 | Goodnow | 24/166 |
| 1,781,709 | 11/1930 | Spear | 24/169 |
| 2,271,132 | 1/1942 | Thoresen | 24/170 |
| 2,818,871 | 1/1958 | Beaudry | 132/48 R |
| 3,049,778 | 8/1962 | Weckesser | 24/176 |
| 3,214,815 | 11/1965 | Mathison | 24/200 |
| 3,247,852 | 4/1966 | Schneider | 128/346 |
| 3,251,108 | 5/1966 | Harrison | 24/166 |
| 3,323,208 | 6/1967 | Hurley | 128/346 |
| 3,823,443 | 7/1974 | Takabayashi | 24/255 SL |
| 3,824,654 | 7/1974 | Takabayashi | 24/198 |

FOREIGN PATENT DOCUMENTS

| 253,693 | 11/1942 | Germany | 24/166 |

Primary Examiner—Bernard A. Gelak

[57] ABSTRACT

A plastic adjuster for adjusting the length of a belt or the like comprises a plate member provided with two slots through which the belt or the like is permitted to pass, a cover plate extended from one end portion of the plate member, a first and second locking elements provided at one end of the plate member and the cover plate respectively and adapted to engage with each other. Thereby the belt is surely clamped at a desired position thereof for adjusting the length.

1 Claim, 9 Drawing Figures

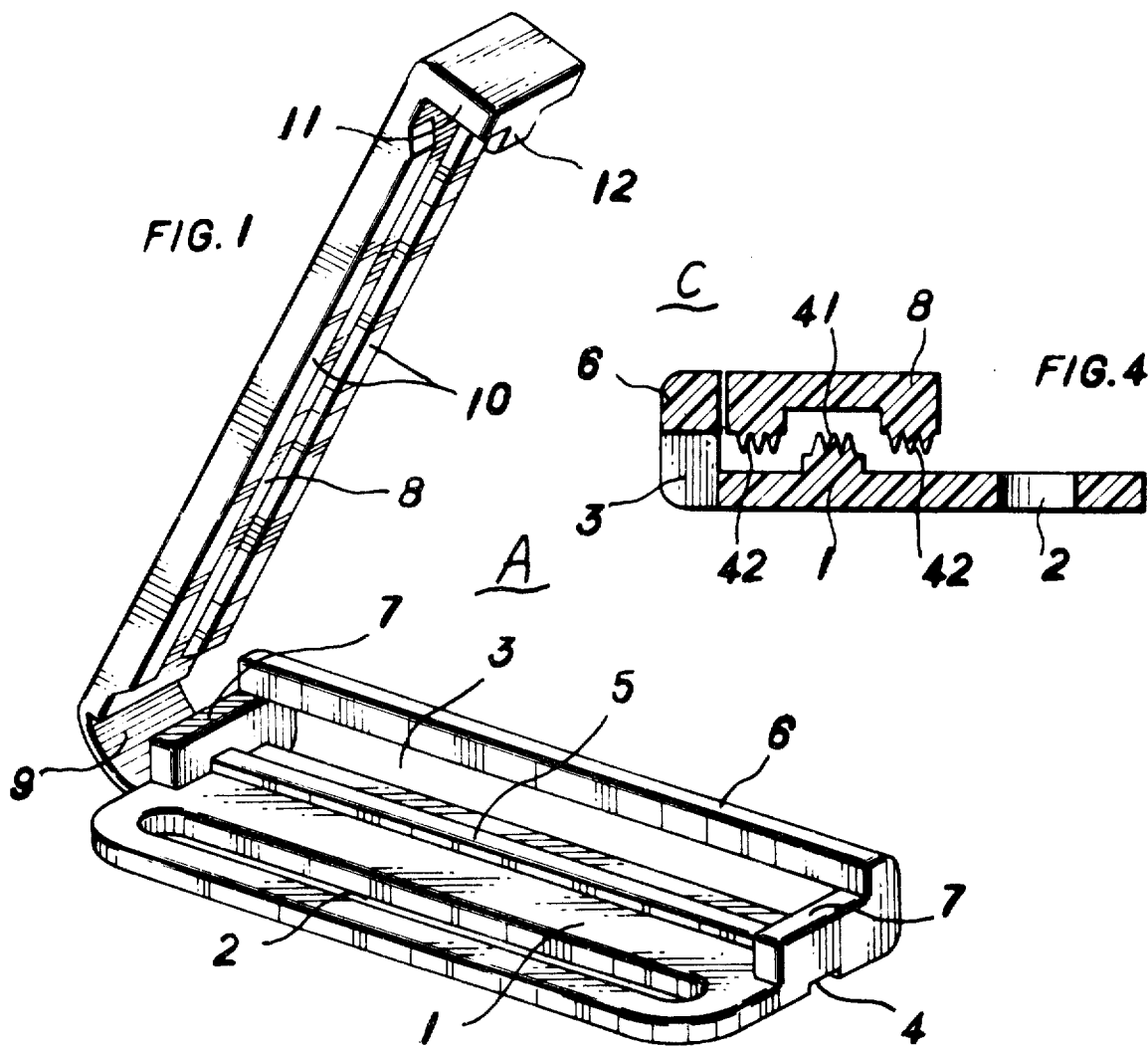
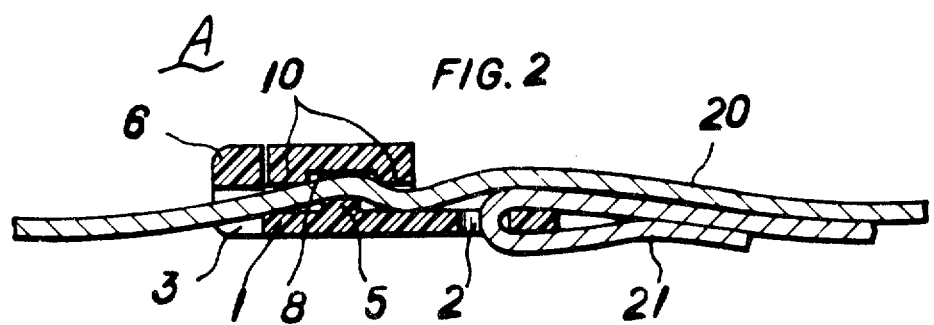

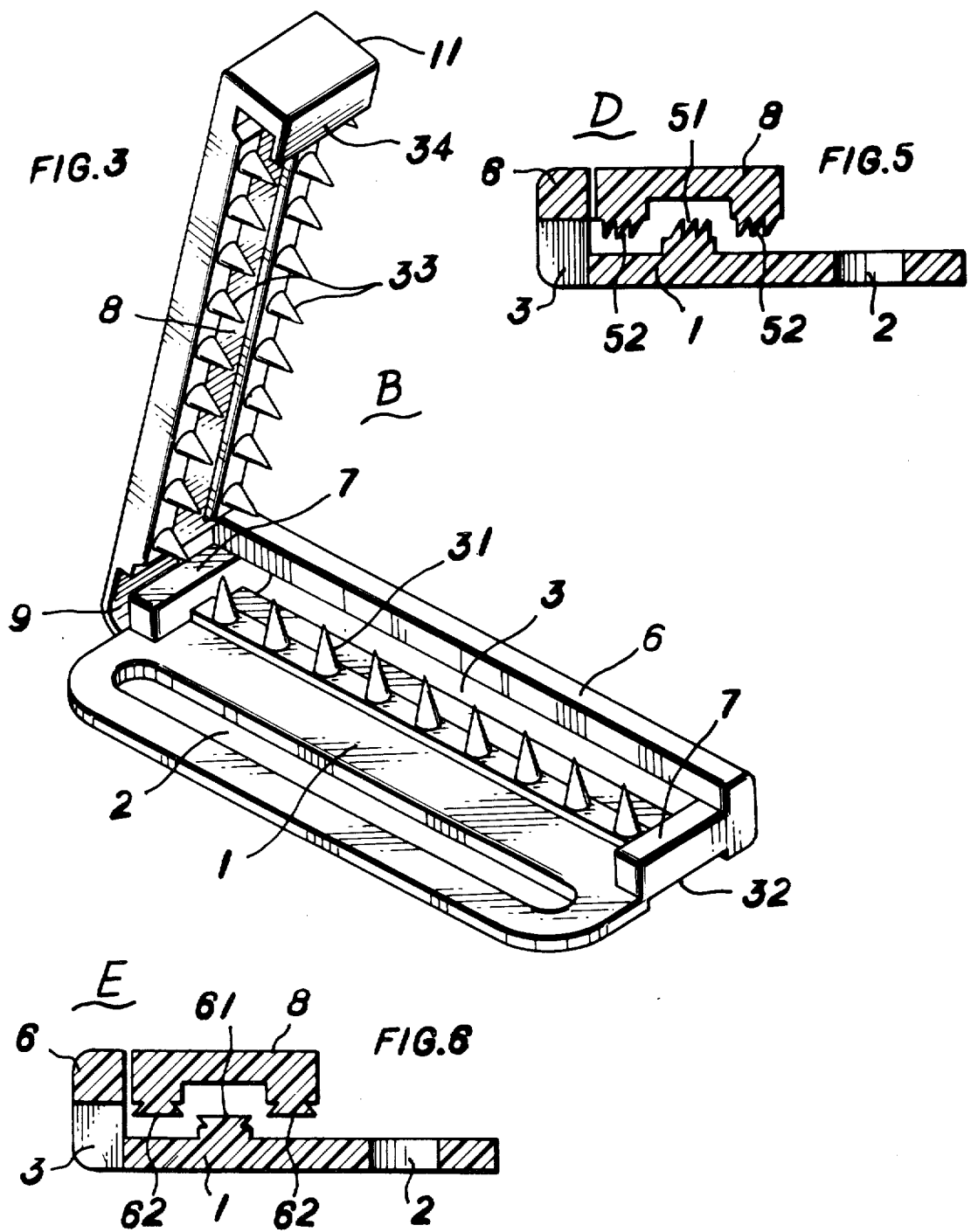

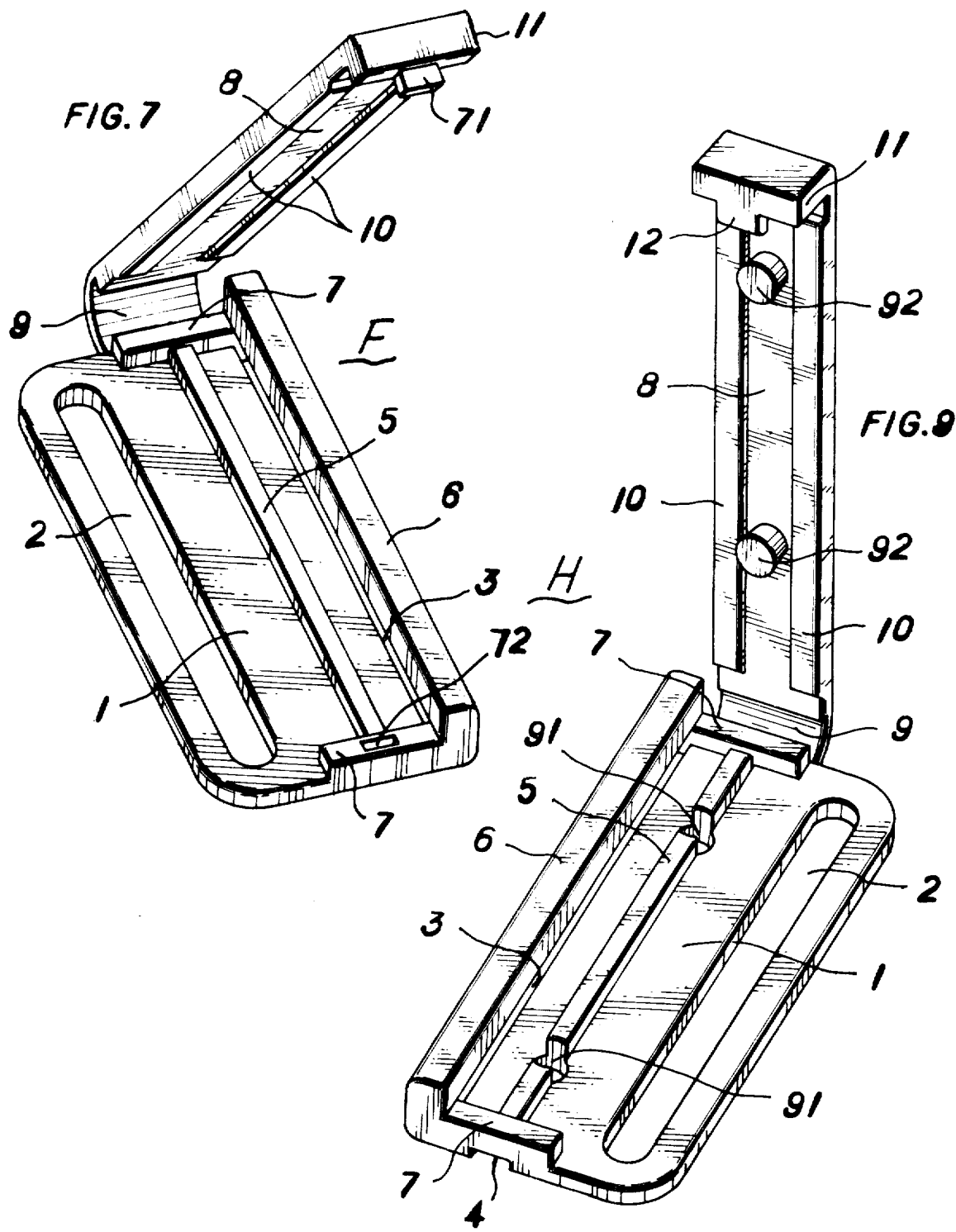

PLASTIC ADJUSTER FOR A BELT

The present invention relates to an adjuster for adjusting the length of a belt or the like.

The conventional adjuster of this kind is operated in such a manner that a lever thereof having a nail at its top end is pivoted about a bearing provided so as to protrude at the side of a cover plate of the adjuster, to adjust the length of a belt or the like. The adjuster of such construction is, however, inconvenient due to the abovemenioned pivotal operation of the lever at the time of clamping and releasing a belt or the like. Moreover, since most of the adjusters are made of metal, they require much time and labor when manufactured and are apt to damage the base sheet of the belt or the like. Further, they give users such uncomfortable feelings as weightiness, hardness, coldness and the like inherent to metal. Consequently, they are not so excellent adjusters for adjusting the length of a belt or the like.

After a long time study for eliminating abovementioned disadvantages of the conventional adjusters and for providing an excellent adjuster, the inventor has succeeded in obtaining such an adjuster which is easily operable and does neither take so much time and labor to manufacture nor give uncomfortable feeling to wearers.

Namely, an adjuster for adjusting the length of a belt or the like according to the present invention is wholly formed of plastic material and has such a construction as follows: there is plate member having a larger width than that of a belt or the like; the plate member is provided with two longitudinally elongated slots, one at each side portion thereof, which permit the belt or the like to pass therethrough; a cover plate is extended from one end of the plate member with an interposition of a bendable portion therebetween; and at the other end of the plate member a first locking element is provided while a second locking element is provided at the free end of the cover plate so as to be engageable with the first one. These and other features and advantages of the present invention will become apparent from the following description of the embodiments given with reference to the appended drawings in which:

FIG. 1 is a perspective view of an adjuster according to the present invention in which a cover plate is in the open position;

FIG. 2 is a cross sectional view of an adjuster according to the present invention to which a belt or the like is applied;

FIG. 3 is a perspective view of a modified embodiment of the adjuster in which a cover plate is in the closed position;

FIG. 4 is a cross sectional view illuistrating a modified embodiment of projections for clamping a belt or the like;

FIG. 5 is a cross sectional view illustrating another modified embodiment of the projections;

FIG. 6 is a cross sectional view illustrating a further modified embodiment of the projections;

FIG. 7 is a perspective view of a modified emobiment of the locking elements;

Figure 8:
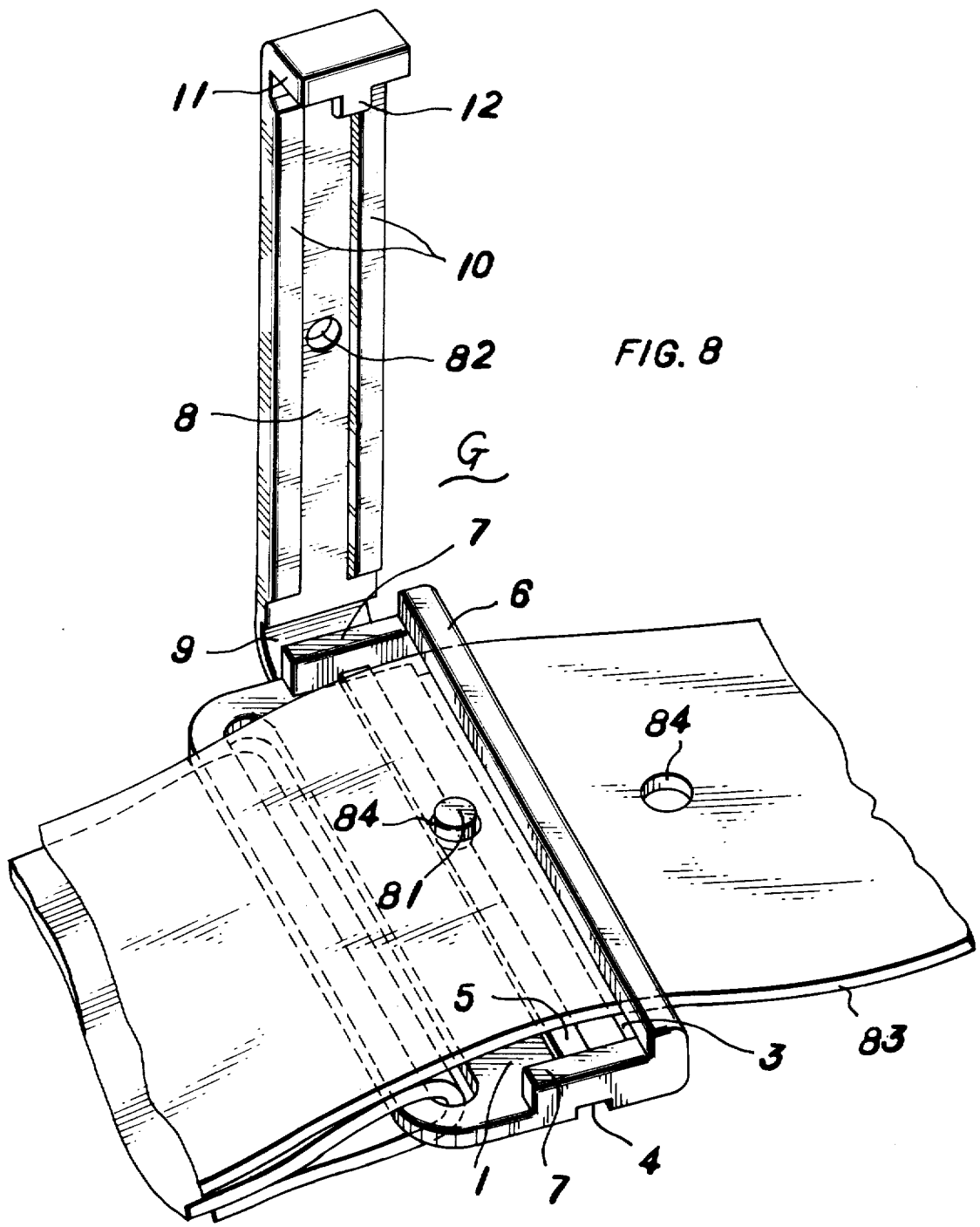

FIG. 8 is perspective view of a modified embodiment of the adjuster in which a cover plate is in the open position; and FIG. 9 is a perspective view of a further modified embodiment of the adjuster in which a cover plate is also in the open position. As shown in FIGS. 1 and 2, an adjuster A according to the present invention is wholly formed of plastic material and has such a construction as follows. A plate member 1 has a large width than that of a belt or the like. The plate member is provided with two longitudinally elongated slots 2, 3, one at each side portion thereof, through which the belt or the like can pass. The edge 6 on the side of the slot 3, of the plate member 1 is bent. The slot 3 is so adapted that a belt or the like passes therethrough substantially in parallel with the plate member so as not to project downwardly, as shown in FIG. 2. Further, at both ends of the plate member 1, there are provided projections 7, 7 which serve as guides at the time of fitting a belt or the like to the adjuster. Such projections 7, 7 are not necessarily provided, but they facilitate the fitting of a belt or the like. Substantilly at the middle portion of the plate member 1, a longitudinal projection 5 is provided which can urge the belt 20 against a cover plate 8, as shown in FIG. 2. The cover plate 8 is extended from one end of the plate member with the interposition of a bendable portion 9, while at the other end of the plate member 1, a first locking element 4 is provided. The cover plate 8 has at the other end a L-shaped portion 11 at the end of which there is provided a second locking element 14 engageable with the first locking element and having a smaller width than that of the L-shaped portion 11. The cover plate 8 is further provided with at least one longitudinally elongated projection 10 for urging the belt 20 against the plate member 1.

The operation of the adjuster is as follows. One end of the belt 20 is inserted through the slot 2, folded back and then seamed thereon so as to provide a loop 21. Then the other end of the belt is also inserted through the slot 2 and superposed on the loop 21. The cover plate 8 is turned back over the belt 20, then engaging the first locking element 4 with the second locking element 12 whereby a solid engagement can be obtained. On the other hand, when it is necessary to change the length of the belt, after disengaging the first and second locking elements 4, 12 from each other, the adjuster is moved to a required position of the belt. Then the two locking elements are brought into engagement with each other again in the same manner as abovementioned.

Referring now to FIG. 3, there is illustrated an embodiment B of the adjuster A. The adjuster B is provided with a first locking element 34 at a L-shaped portion formed integrally with a cover plate, the first locking element 34 having the same width with that of the L-shaped portion 11. On the other hand, there is provided a second locking element 32 engageable with the first one 34 and having a larger width than that of the element 4. For securely clamping the belt between a plate member and the cover plate, the plate member is provided with a projecting portion 31 comprising at least one conical projection formed integrally therewith, while the cover plate is also provided at both side portions with longitudinal projecting portions 33, 33 similarly comprising at least one conical projection.

The projection for the projecting portion need not always be conical, but may have any other shape e.g. a circular cylinder.

FIGS. 4-6 illustrate embodiments of projecting portions for securely clamping a belt or the like. In the embodiment C, the projecting portions 41, 42 comprise at least one projection having a triangular section, while in the embodiment D, projecting portions 51, 52 comrpise at least one sawtoothed projection. In the embodiment E, projecting portions 61, 62 comprise a projection having an inversed trapezoidal section, respectively.

FIG. 7 is a perspective view for illustrating the engagement of the first and second locking elements mentioned with reference to FIG. 1. In an adjuster F, at one end of a plate member 1 there is provided a first locking element 72 in the form of a slot elongated laterally of the plate member. The slot is formed in such a manner that the upper portion thereof is more reduced in width by a predetermined amount than the lower portion. On the other hand, at the free end of a L-shaped portion 11 of the cover plate 8 there is provided a second locking element 71 extendng from the portion 11 and engageable with the first locking element. The second locking element 71 is more reduced in width at the top end thereof by a predetermined amount than at the lower portion adjacent to the L-shaped portion. Further, the second locking element 71 is press-fitted in the first locking element by making use of the elasticity of plastic material, thus preventing easy disengagement. The second locking element 71 need not necessarily have a rectangular section, but may be of an inverted trapezoidal section with a larger diameter at the upper portion thereof. In such a case, the fist locking element 72 comprises a cylindrical opening having an inversed trapezoidal section with a smaller diameter at the upper portion thereof so that the second locking element can be press-fitted in the first one, thus preventing easy disengagement.

FIG. 8 is a respective view for illustrating a modified embodiment G of the adjuster A mentioned with reference to FIG. 1. In the adjuster G, substantially at the middle of a plate member 1, there is provided a projection 81. The projection 81 is a substantialy circular cylindrical shape with a predetermined diameter but not limited thereto. The height of the projection is such that it does not protrude through an opening 82 beyond the cover plate 8 but is in aligment with the latter when the cover plate is in the closed position with the locking elements 4, 12 being in engagement. As abovementioned, the opening 82 is provided substantially at the center of the cover plate 8 for fitting the projection thereinto when the cover plate is in the closed position. The opening 81 is not necessarily a through hole but may be of any form so long as it corresponds to the form of the projection 82, e.g. a recess permitting only the engagement with the projection. In this case, the height of the projection 81 is formed shorter than that in case of a through hole. In FIG. 8, there are provided one projection 81 and one opening 82 to form a pair. However, when the belt is provided with a plurality of openings 84 or a slit 84 aligned or elongated longitudinally of the plate member, a plurality of pairs of projections 81 and openings 82 may be provided correspondingly. In the latter case, the projection 81 and the opening 82 may be in the form of an elongated projection and a slit or channel-like recess, respectively. Further, to provide an engagement between the projection 81 and the opening 82, the arrangement may be such that the projection 81 has a larger diameter by a predetermined amount at the upper portion thereof than at the lower portion, while the opening 82 has a larger diameter by a predetermined amount at its portion corresponding to the outer surface of the cover plate when the projection is fitted into the opening, than at its portion corresponding to the inner surface thereof. Further, the opening is smaller in diameter by a predetermined amount than the projection at any corresponding position. When the cover plate 8 is turned back over the plate member 1, the projection 81 is press-fitted into the opening by making use of the elasticity of the plastic material, thus preventing easy disengagement. Accordingly, if the projection 81 and the opening 82 are adapted to be engageable with each other, the first and second locking elements 4, 12 are not necessarily provided.

Referring now to FIG. 9, there is shown a further embodiment H of the adjuster A. In the embodiment H, two pairs of projections 92 and openings 91 each similar to the projection 81 or the opening 82 in FIG. 8 are provided in a cover plate and a plate member in the reversed relation to FIG. 8. Namely, the openings 91 each similar to the opening 82 are provided in the plate member 1 while the projections 92 each similar to the projection 81 are provided on the cover plate 8. The function, operation and modifications of the embodiment H are similar to those of the embodiment G in FIG. 8, and the description thereof is omitted here.

As abovementioned, the adjusters described with reference to FIGS. 8 and 9 are extremely useful for adjusting the length of the belt or the like.

With the abovementioned arrangements, an adjuster according to the present invention is convenient to adjust the length of a belt or the like. The adjuster can be manufactured by the integral molding, thus saving time and labor for manufacture. Further, since the adjuster according to the present invention is formed of plastic material, it will not give uncomfortable touch and feeling to users, unlike a metal one.

Thus, an adjuster according to the present invention is of a high practical value.

What is claimed is:

1. A plastic adjuster for adjusting the length of a belt or the like comprising an elongated generally flat plate member (1) and a cover plate (8) which are integrally formed, the plate member having a pair of elongated side edges and a pair of transversely extending end edges and an elongated slot (2) adjacent one of the side edges and extending parallel thereto, a guide projection (7) extending upwardly from the plate member adjacent each of the end edges thereof and extending perpendicularly to the slot, and a bar (6) extending across the guide projections above the plane of the plate and adjacent the other side edge of the plate member to form a second slot (3) between the bar and the plate member which extends parallel to the first slot, said first slot (2) being adapted to receive a looped end portion of the belt and said second slot (3) being constructed and arranged to permit the belt to pass through the slot in a direction generally parallel to the flat plate member, at least one longitudinally extending clamping means (5) on the plate member extending between the guide projections for clamping the belt against the cover plate, and locking means provided on one end of the plate member, the cover plate being connected to the other end of the plate member by a bendable portion, the cover plate including locking means engageable with the locking means on the plate member, the cover plate extending parallel to and adjacent said bar (6) when the two locking means are engaged, and at least one longitudinally extending clamping means (10) for clamping the belt against the plate member, the clamping means of the plate member and the cover plate being offset relative to each other.

* * * * *